United States Patent [19]

Fogal et al.

[11] Patent Number: 4,763,392
[45] Date of Patent: Aug. 16, 1988

[54] METHOD OF MANUFACTURING A TOTALLY COATED TIRE RIM

[75] Inventors: Robert D. Fogal, Chambersburg, Pa.; Albert A. Taber, Richmond, Mo.

[73] Assignee: International Marketing Inc., Chambersburg, Pa.

[21] Appl. No.: 36,659

[22] Filed: Apr. 10, 1987

[51] Int. Cl.⁴ ............................................... B21H 1/10
[52] U.S. Cl. ..................... 29/159.1; 29/802; 29/402.02; 29/402.18; 152/513; 301/63 PW; 427/435
[58] Field of Search ................. 29/159.1, 159.01, 802, 29/402.02, 402.18; 301/63 PW; 427/435; 152/513

[56] References Cited

U.S. PATENT DOCUMENTS

| 4,305,622 | 12/1981 | Mitchell | 29/159.1 |
| 4,363,347 | 12/1982 | Baumgartner | 301/63 PW |
| 4,607,892 | 8/1986 | Payne et al. | 301/63 PW |

*Primary Examiner*—P. W. Echols
*Attorney, Agent, or Firm*—Diller, Ramik & Wight

[57] ABSTRACT

A method of manufacturing a rust-proof, leak-proof and air-impervious welded tire rim by providing a pair of rim bodies each of which includes a peripheral bead and at least one of which includes a valve seat defined by an opening and with the rim bodies being welded to each other along an exterior circumferential weld; liquid-cleaning the welded rim; and applying to the entirety of all exposed surfaces of the rim an air-impervious coating of resilient copolymeric material whereby any porosity of the circumferential weld is sealed against air migration and the rim beads and valve seat are all totally coated with a resilient air-impervious coating for effectively sealing against air migration in association with a tire bead and an air valve body, respectively.

47 Claims, 2 Drawing Sheets

U.S. Patent  Aug. 16, 1988  Sheet 1 of 2  4,763,392
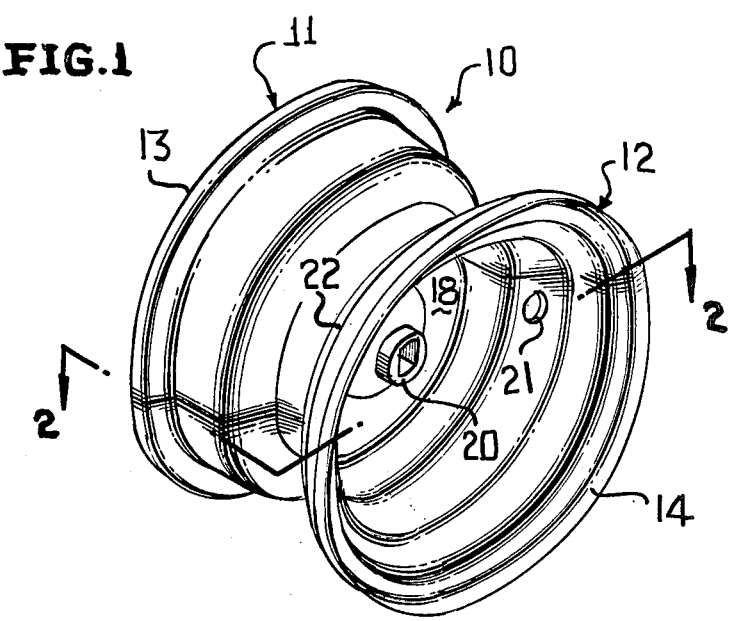
FIG.1
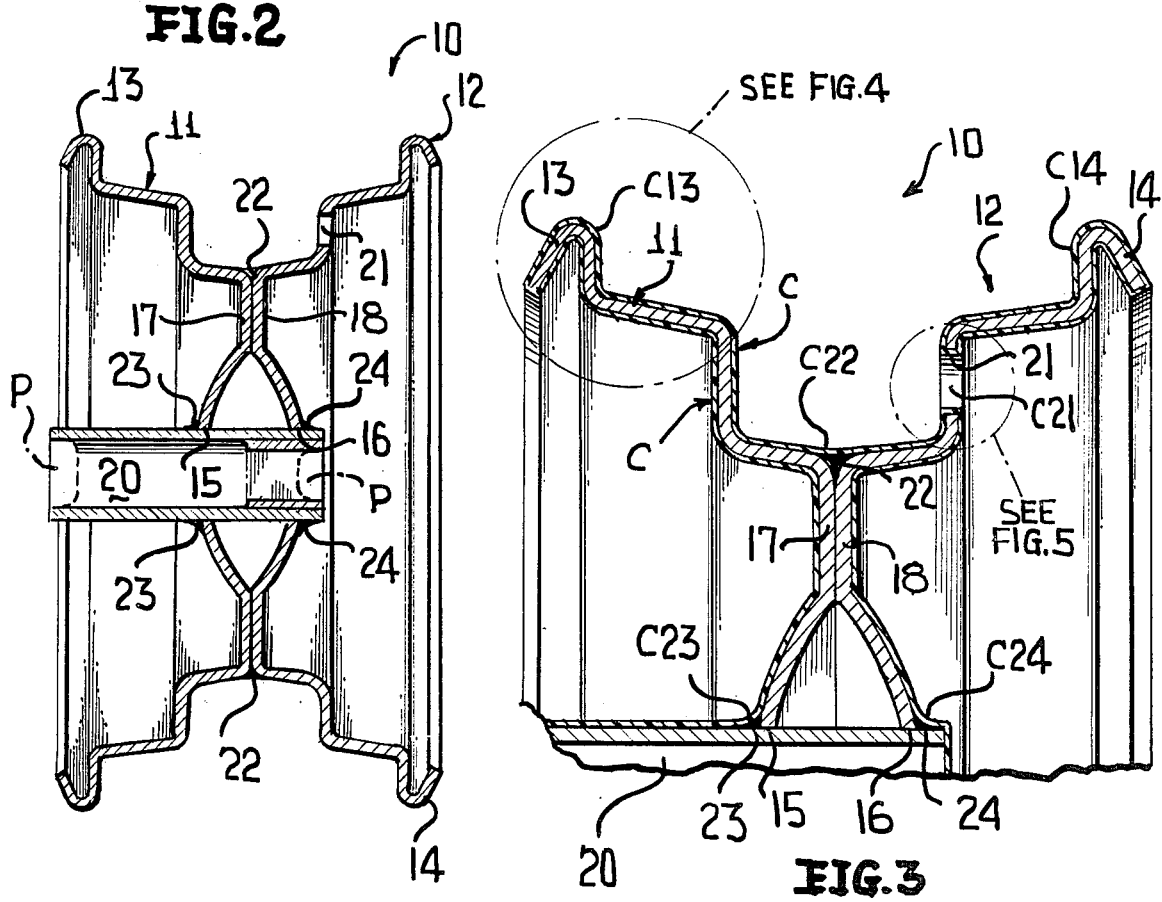
FIG.2
FIG.3

METHOD OF MANUFACTURING A TOTALLY COATED TIRE RIM

BACKGROUND OF THE INVENTION

It has been conventional to apply a relatively resilient air-impervious coating of polymeric/copolymeric material to the interior of tires by a spraying process, particularly prior to the retreading thereof. During the retreading process, the polymeric/copolymeric coating prevented pressurized air from migrating from the interior of the tire to the interface between the buffed outer surface and the new tread thereby assuring an excellent bond between the "old" tire and the "new" rubber/precure bonded thereto. Such retreads, when in use, also tended not to develop "leakers" as readily as uncoated tires since the polymeric/copolymeric coating material prevented air under pressure from escaping through the tire/carcass, particularly if the latter was relatively old, porous, worn, cracked or the like. While it might be expected that tires so coated would not leak or leak appreciably less than uncoated tires, it was noted that in actual practice tires so coated at least appeared to deflate at a percentage greater than that which was expected. This was particularly true in large tractor-trailer tires but was found to be just as equally true in smaller garden-type riding tractors, as well as passenger automobile tires.

While the industry has seemingly directed its efforts toward reducing/eliminating air migration through the tires, be they new, after-market or retread, applicants herein began their investigation of leakage with the assumption that air migration through the tires per se was virtually eliminated by standard practices/coatings, and there must be some underlying cause for deflation/leakage. Through observation, analysis and experimentation, it was found that apart from leakage through new and recap tires, leakage also occurred (1) between conventional rims and associated valves, (2) between tire beads and wheel rim beads, and, most surprisingly, (3) through interstices in the metallic rims and porous welds associated therewith, particularly in the case of small garden-type rims formed of two welded bodies. Some leakage also occurred (4) simply because of dirt and rust between the metallic wheel beads and the tire beads, particularly in the case of after market recap/retread tires which are simply reapplied to dirty/rusted wheel rims essentially incapable of maintaining an air-impervious seal therebetween.

Accordingly, the invention provides a novel method of preventing air leakage from associated inflated tires mounted on metallic rims by (a) first cleaning and derusting the associated rims and (b) thereafter entirely coating all surfaces of the rim with an air impervious coating of resilient polymeric material whereby the porosity/nicks/cracks/remaining dirt/rust, etc. is coated and effectively sealed against air migration in association with a new or retread tire bead and an associated air valve body.

SUMMARY OF THE INVENTION

The invention is directed to a novel method of creating an air-impervious wheel for a vehicle by liquid-cleaning a metallic rim thereof to remove dirt, grime, rust, etc.; and applying to the entirety of all exposed surfaces of the rim an air-impervious coating of resilient polymeric/copolymeric material whereby any porosity, nicks, cracks, rust, or similar defects are sealed against air migration and the rim beads and associated valve seat are all totally coated with a resilient air-impervious coating to thereby effectively seal against air migration in association with an associated tire bead and air valve body.

A further object of this invention is to provide a novel method as aforesaid wherein the rim is formed of a pair of rim bodies welded to each other along an exterior circumferential weld, and the entirety of the weld is also totally coated with the air-impervious coating of resilient copolymeric material thereby precluding air-migration through the porosity of the weld or any gaps between the rim bodies in areas in which the weld is discontinuous.

Still another object of this invention is the provision of a novel method of manufacturing a leak-proof and air impervious wheel/tire rim as aforesaid in which the liquid cleaning step is performed utilizing a heated water bath including a blend of caustic alkalies, sequestrants and surfactants, and the coating applying step is performed utilizing a styrene-acrylate copolymer.

Still another object of this invention is to provide a novel method as aforesaid wherein the coating-applying step is performed utilizing in conjunction with the styrene-acrylate copolymer methyl alcohol, aqua ammonia and water with the copolymer constituting a major portion of the coating.

Still another object of the invention is to provide a novel method as aforesaid wherein the liquid cleaning step is performed by dipping the rim in a bath of cleaning liquid at an elevated temperature causing attendant vaporization of the cleaning liquid; elevating the rim above the cleaning liquid bath, and spraying water upon the rim to rinse the same and simultaneously therewith collecting the sprayed water in the cleaning liquid bath to replace vaporized liquid.

Yet another object of this invention is to provide a novel method as aforesaid wherein the plurality of the rims are simultaneously cleaned and dipped by moving the rims successively down into and up out of a bath of the cleaning liquid and copolymeric material, respectively; and transferring the rims along a generally horizontal path from the cleaning liquid bath to the copolymeric material bath.

With the above and other objects in view that will hereinafter appear, the nature of the invention will be more clearly understood by reference to the following detailed description, the appended claims and the several views illustrated in the accompanying drawings:

BRIEF DESCRIPTION OF THE DRAWINGS

FIG. 1 is a perspective view of a rim, and illustrates two rim bodies joined to each other by an associated exterior circumferential weld.

FIG. 2 is a cross-sectional view taken generally along line 2—2 of FIG. 1, and illustrates the weld, two other welds connecting the rim bodies to a shaft, beads of the rim, and a circular opening in one of the rim bodies for an air valve.

FIG. 3 is an enlarged axial cross-sectional view of a portion of the rim of FIG. 2, and illustrates an air-impervious coating of resilient copolymeric material totally coating the rim including the beads thereof, the valve opening, and the welds.

DESCRIPTION OF THE PREFERRED EMBODIMENT

Figure 5:
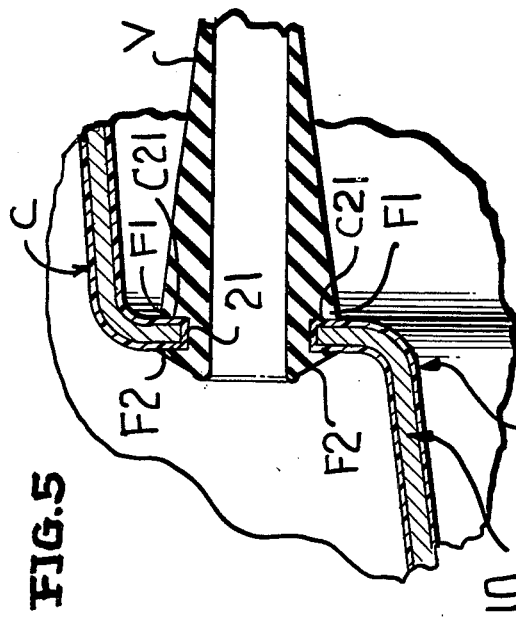
FIG. 5 is an enlarged fragmentary cross-sectional view of the encircled portion of FIG. 3, and illustrates an air valve body sealed to the polymeric coating of the rim opening.

A method of manufacturing rust-proof, leak-proof and air-impervious tire rims in accordance with this invention will be described hereinafter, but reference is first made to FIGS. 1 and 2 of the drawings in which is illustrated a metallic tire rim 10.

The tire rim 10 is formed of two generally identical rim bodies 11, 12 having respective beads 13, 14 and circular openings 15, 16, respectively. The rim bodies 11, 12 are generally of an annular configuration and include respective annular walls 17, 18 in abutting relationship to each other. A tubular sleeve 20 is received in the openings 15, 16 and serves as a support for an associated drive shaft (not shown). The rim body 12 also includes a circular opening 21 for an air valve/air valve body V, which will be described more fully hereinafter relative to FIG. 5 of the drawings. Three exterior circumferential welds 22 through 24 retain the three elements of the rim 10 in rigid relationship to each other. The weld 22 is an exterior circumferential weld generally at the radially outermost inner face (unnumbered) of the annular walls 17, 18, while the welds 23, 24 are also complete circumferential welds uniting radially innermost portions (unnumbered) of the annular walls 17, 18 to the tube or tubular sleeve 20. The metallic rim 10 in the preferred embodiment of the invention is specifically designed for utilization with a relatively small riding-type garden tractor, but in accordance with the present invention the rim 10 could as well be a larger passenger-type automotive metallic rim, a tractor-trailer rim or still larger rims of the type utilized in large earth-moving equipment. Furthermore, while the preferred embodiment of the invention is particularly adapted to rendering a multi-piece rim rust-proof, leak-proof and air-impervious, including the walls thereof, the invention is equally applicable to a one-piece rim, be it sheet metal or cast metal. Thus, irrespective of the specifics of the preferred embodiment of the rim 10 heretofore set forth, the method to be described hereinafter seeks to prevent air leakage between any tire and an associated rim and through any rim, one-piece or multi-piece including leakage past a seal created in accordance with the method between the rim bead and the associated tire bead and a valve rim opening and an associated valve body.

Furthermore, the invention is equally applicable to new and/or used rims, although the latter presents additional problems, as, for example, excessive dirt, wear, rust, nicks, dents, etc. which tend to create a rim more susceptible to leakage than a new relatively unabused rim.

Figure 6:
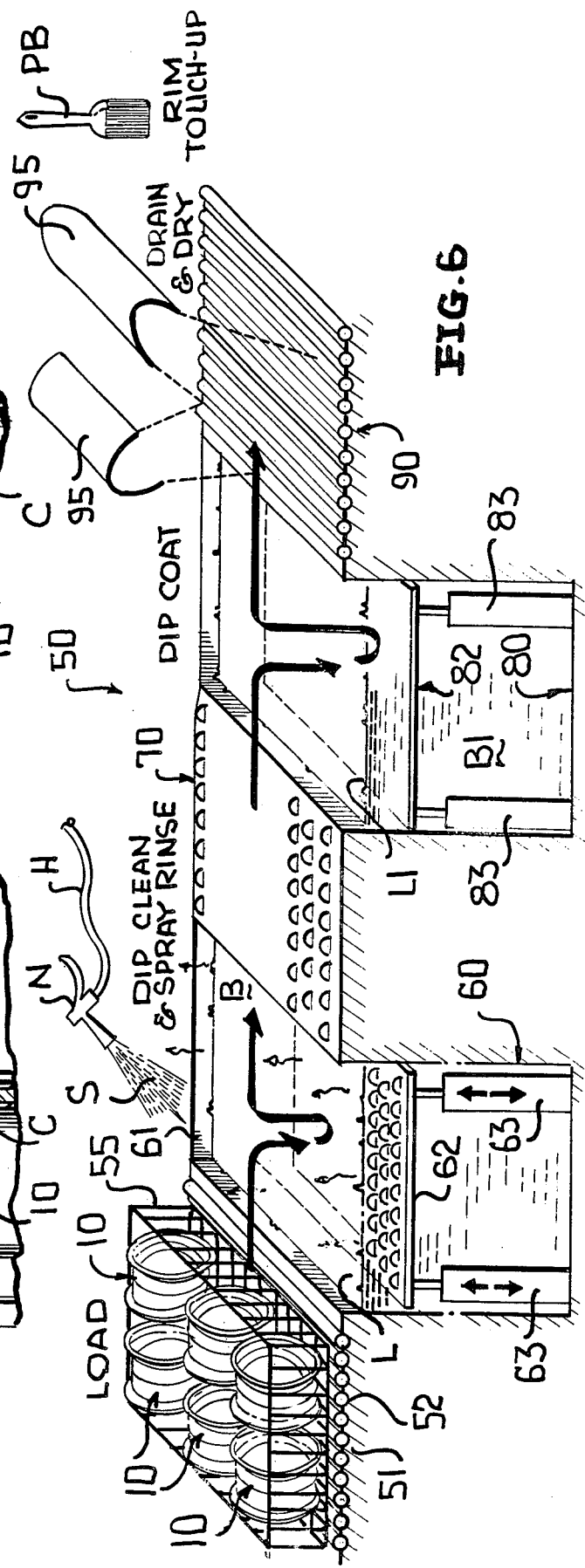
FIG. 6 is a perspective view of an apparatus constructed in accordance with this invention, and illustrates the manner in which a plurality of metallic rims are simultaneously liquid-cleaned and derusted, rinsed, coated and dried.

Reference is now made to FIG. 6 of the drawings which illustrates a novel apparatus 50 in keeping with which the preferred method of the present invention is performed.

The apparatus 50 includes conveyor means in the form of a generally horizontally disposed roller conveyor 51 formed of a plurality of rollers 52 upon which is supported a relatively shallow wire basket 55. Several of the rims 10 of FIGS. 1 and 2 are shown supported upon the basket 55 upon the peripheral beads 13, 14 thereof. If for some reason it is desired not to coat the interior of the tubes 20, the latter are preferably closed at each axially end by conventional plugs P (FIG. 2) which can be removed at the completion of the cleaning/coating method. Obviously, many rims, such as automotive and tractor-trailer rims, need not be plugged. Furthermore, the size of the basket 55 and the number of rims 10 which can be accommodated thereupon can vary, and in the case of tractor-trailer-type rims, the basket is preferably sized to accommodate a total of six rims standing on edge, although with the smaller garden riding tractor rims 10, the basket 55 could accommodate upwards of two to three dozen rims dependent upon, of course, the through-put of the overall apparatus 50.

The apparatus 50 further includes a relatively large rectangular dip tank 60 containing a liquid bath B of a cleaning/derusting solution to be described more specifically hereinafter. An upper level L of the bath B is slightly below an upper edge 61 of the tank 60. A platform 62 can be elevated and lowered by conventional hydraulic cylinders 63 between an uppermost position at which the platform 62 is essentially horizontally aligned with the rollers 52 and a lower position at which the basket 55 and the rims 10 therein are totally immersed in the bath B. Preferably the platform 62 also has a plurality of horizontal or ball rollers (not shown) so that the basket 55 can eventually be readily removed therefrom by a rolling action toward another ball or roller conveyor 70 after the cleaned, degreased, and derusted rims have been rinsed by a spray S of cold water from a conventional hand-held nozzle N connected to a suitable hose H. As will be seen hereinafter, the cleaning solution of the bath B is heated (approximately 200°–210° F.) and attendant vaporization is balanced by the cold water from the spray S returning into the bath B in the tank 60 during the rinsing operation. The rims 10 are essentially maintained totally immersed in the cleaning solution of the bath B for approximately 10–30 minutes, elevated therefrom, rinsed by the cold water spray S, transferred along the conveyor 70 and subsequently positioned along with the basket 55 atop another platform 82 of a coating tank 80 containing a bath B1 of a coating solution having an upper level L1.

The platform 82 can be lowered and elevated through a conventional set of hydraulic cylinders 83, and when totally immersed, the rims 10 are entirely coated with the coating solution of the bath B1. After a predetermined time period of immersion in the bath 80, for example 160 seconds, the platform 82 is elevated until it is generally horizontal to the conveyor 70 and a take-away conveyor 90, and the basket 55 is simply rolled to the right along ball or roller conveyors of the platform 82. While upon the roller conveyor 90, the coating C (FIG. 3) upon each of the rims 10 can dry under ambient condition or through conventional heat lamps 95. Excess coating solution which drips from the rims 10, the basket 55 and the conveyor 90 can be caught in a catch tank (not shown) and simply returned to the tank 80. Thereafter the coated rims 10 are removed from the basket 55 and any areas thereof which may not have been coated while in the tank 80, such as minor areas of the lower peripheral beads 13, 14 which rested upon wires of the basket 55, are then hand-coated with the coating solution of the bath B1 by a manual operation through utilization of a paint brush PB whose bristles, obviously, have been immersed in the coating solution of the tank 80 and applied to any uncoated areas of the rims 10.

Figure 4:
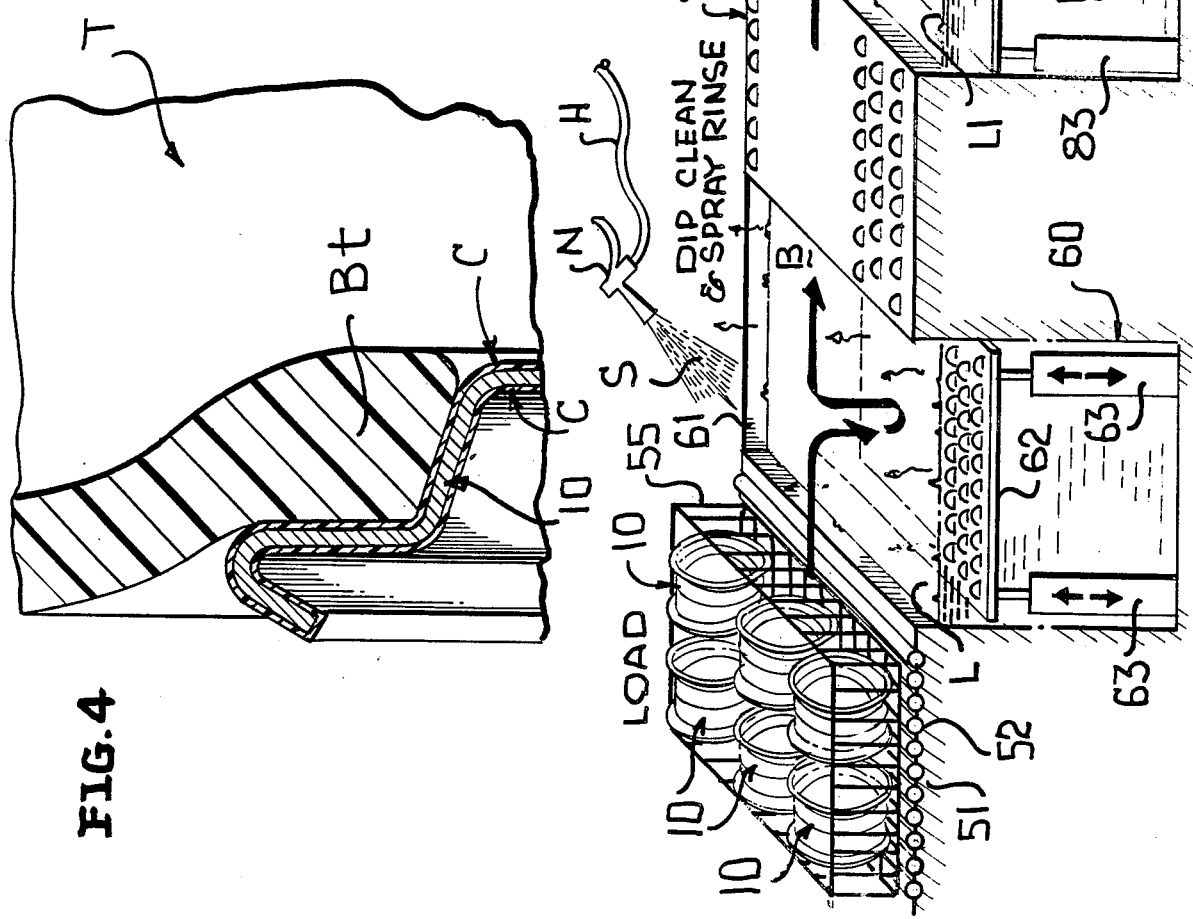
FIG. 4 is an enlarged fragmentary cross-sectional view of the encircled portion of FIG. 3, and illustrates the manner in which a tire bead forms an intimate air-impervious seal with the copolymeric coating at the wheel bead.

Reference is now made to FIG. 3 which illustrates the manner in which the coating C is totally applied to the entire exterior of the rim 10, thus assuring that when a tire T (FIG. 4) is placed thereupon in bead-to-bead contact and inflated, none of the air can escape. More specifically, the coating C forms a resilient air-impervious, rust-proof and leak-proof coating of the entire rim 10, but particularly portions C13, C14 at the beads 13, 14, a portion C22 at the weld 22, portions C23 and C24 at the welds 23, 24, respectively, and a portion C21 at the valve opening 21. In this fashion the coating portions C13, C14 form resilient air-impervious seals between the beads 13, 14 of the rim 10 and the beads Bt of the associated tire T (FIG. 4). Likewise, the resilient polymeric coating portion C21 also forms a resilient air-impervious leak-proof seal between the body V of an associated conventional valve and its sealing/securing flanges F1, F2 (FIG. 5). Finally, any imperfections, breaks, irregularities, discontinuities and/or the porosity of the welds 22–24 is effectively sealed by the peripheral impervious polymeric coating C22–C24, respectively. In this fashion, the eventual entirely coated rim 10 of FIG. 3 is most assuredly capable of preventing leakage of air in any fashion from the interior of the tire T, and is also assured of being totally protected against exterior and interior environmental attack, the latter being created simply by the moisture in the internal air which normally would cause the rim to rust interioriy in a conventional metallic rim which is, of course, precluded by the total coating C. Furthermore, any defects, such as nicks, scratches, dents or the like which are often found in the beads 13, 14 of used rims, particularly in association with retread tires, are totally covered by the coating C, particularly by the coated portions C13 and C14, thus, basically creating smooth, continuous sealing surfaces from otherwise discontinuous surfaces.

In accordance with the apparatus 50 just described and the method associated therewith, the following represents the preferred formulations for the cleaning-/derusting solution B of the tank 60 and the coating solution B1 of the coating tank 80.

The cleaning/derusting solution B is a heated bath of water, caustic alkalies, sequestrants, and surfactants maintained at a temperature range of generally between 200°–210° F., during which the rims 10 are immersed for between 10–30 minutes, although 15 minutes is normally sufficient for virtually any size or shape rim, including the preferred embodiment rim 10. One such cleaning solution is manufactured and sold by Magnus, a division of Economics Laboratory, Inc., Osborn Building, St. Paul, Minn. 55102 under the name "Magnus 61-DRX". The latter is a powdered blend of caustic alkalies, sequestrants, and surfactants in a white granular powder which is added at the rate of 1 to 1½ pounds (12–18%) per gallon of cool water while stirring or agitating the solution until complete dissolving is accomplished. The pH 1% solution is 13 typical and preferably the heating is accomplished through the use of stainless steel heating coils. The use of mechanical agitation will decrease the amount of time required to clean, derust, and, if painted, strip any paint thereon. (After draining and rinsing, a suitable rust preventitive could be utilized, particularly for in-plant storage, such as Magnus 26N or 1073, available from the latter corporation.)

The formulation for the coating solution bath B1 is formed of the following components and proportions:

| A. | 119 lb.   | 76 Resin 1018              | 82.35% |
|----|-----------|----------------------------|--------|
|    | 12 oz.    | Colloids 681F              | .52%   |
| B. | 11 oz.    | Aqua Ammonia               | .48%   |
|    | 16 oz.    | Water                      | .69%   |
| C. | 13 oz.    | Anti-Rust Mixture          | .56%   |
|    | 5.9 oz.   | Surfynol 104 Surfactant    | .25%   |
|    | 112 oz.   | Ethylene Glycol Butyl Ether| 4.84%  |
| D. | 105.6 oz. | Methyl Alcohol             | 4.57%  |
|    | 132.8 oz. | Water                      | 5.74%  |

Component A is first thoroughly mixed with high sheer agitation and components B, C and D are all individually thoroughly premixed. After premixing, component B is added to component A with high sheer agitation followed by the addition of premix C, again with high sheer agitation, followed by the addition of component D, again with high sheer agitation.

When the rims are dip-coated in the bath B1, as described earlier, a coating of approximately 1–3 mm is obtained, and preferably a coating of a total thickness of 2 mm is preferable. The latter is effected during immersion of approximately 160 seconds.

The 76 Resin 1018 is a trademark of Union Chemicals Division, Union Oil Company of California, 1900 East Gulf Road, Schaumburg, Ill. 60195. This resin is a styrene-acrylate copolymer which is a milky fluid, dilutable in water, and having a boiling point of approximately 212° F. (100° C.). Additives include trace amounts of formaldehyde, surfactant, ammonia and the residule acrylamide, acrylate and styrene.

Colloid 681F is the tradename of a liquid anti-foam available from Colloids, Inc. 394 Frelinghuysen Avenue, Newark, N.J. 07114. Typical properties include:

| Appearance:              | Off-White, opaque liquid |
|--------------------------|--------------------------|
| ph (5% dispersion) @ 25° C.: | 5.5                  |
| Specific Gravity @ 25° C.:   | 0.88                 |
| Viscosity @ 25° C.; cps:     | 300                  |
| Pour Point, °C.:             | −17° C.              |
| Flash Point (PMCC); °C.:     | 179                  |

Brookfield LVF, #2 spindle @ 60 RPM.

Aqua Ammonia (ammonia hydroxide—NH4CH) is available from Occidental Chemical Corporation, Occidental Chemical Center, 360 Rainbow Boulevard, South, Box 728, Niagara Falls, N.Y., 14302. Typical physical data and ingredients are as follows:

PHYSICAL DATA

| Boiling Point (at 1atm-29.4% Solution) 27° C. | Specific Gravity (25% solution) 0.91 (7.6 lbs/gal) |
|------------------------------------------------|----------------------------------------------------|
| Melting Point −98.3° F.                        | pH 14                                              |
| Solubility In Water Soluble at all concentrations | Vapor Pressure (mm Hg 20° C.) 390               |
| Appearance and Color Clear, colorless liquid with a pungent odor | Vapor Density (Air = 1) 0.6         |

INGREDIENTS

|  | Percent | Threshold Limit Values |
|---|---|---|
| $NH_3$ | 24.5–25.5 | The TLV ® limits established by ACGIH (1984–85) are: |
|  |  | TWA     STEL |
|  |  | 25 ppm     35 ppm |
|  |  | 18 mg/m$^3$     27 mg/m$^3$ |
| Water | 74.5–75.5 | Not applicable |

The anti-rust mixture is formed from a 128 oz. Water, 36 gram Sodium Nitrate and 11.5 oz. Sodium Benzioate.

Surfynol is a registered trademark of Air Products and Chemicals, Inc., Box 538, Allentown, PA 18105, and it is a proprietary mixture of the latter containing 2, 4, 7, 9, Tetramethyl-5-decyne-4,7-diol (TMDD) and 2-butoxyethanol (butyl cellosolve) (TMDD-$C_{14}H_{26}O_2$; 2-butoxyethanol-$C_6H_{14}O_2$) Typical physical data includes:

| Apearance | Clear, pale yellow liquid |
|---|---|
| Odor | Mild, methol-like |
| Boiling Point | 11° C. at 100 mm Hg |
| Specific Gravity ($H_2O$ = 1) | 0.903 @ 25° C. |
| Solubility in Water | <1% |
| Vapor Pressure | 11 mm Hg @ 25° C. |

Ethylene Glycol Butyl Ether is available from Dow Chemical U.S.A., Midland, Mich. 48674 under the registered trademark "Dowanol" having the following physical data:

| Boiling Point: | 340 F |
|---|---|
| Vap Press: | 0.88 mm Hg @ 25 C |
| Vap Density: | 4.10 |
| Sol. in Water: | Infinitely |
| Sp. Gravity: | .897 @ 25/25 C |
| Appearance: | Water white liquid |
| Odor: | Ether-like odor |

Methyl alcohol (methanol) is readily available commercially (E. I. du Pont de Nemours & Co., Wilmington, Del. 19898.

When the latter-described solution has been applied to and dried upon the rims 10, the appearance is virtually perfectly clear and transparent and at a thickness ranging from 1–3 mm, is quite resilient and, thus, acceptable for intimate contact and air-impervious sealing with the associated tire T, the beads Tb, and the valve V.

In situations in which it is also desired to "paint" the rim 10, a pigmented formulation of the cleaning solution B is obtained from the following formulation:

| A. | 2224.00 oz. | 76 Resin 1018 | 75.23% |
|---|---|---|---|
|  | 5:72 oz. | Colloids 681F | .19% |
| B. | 305.40 oz. | Water | 10.33% |
|  | 11.60 oz. | Aqua Ammonia | .39% |
| C. | 10.75 oz. | Potassium Tri Poly Phosphate | .36% |
| D. | 7.00 oz. | Surfynol 104BC Surfactant | .24% |
|  | 119.00 oz. | Ethylene Clycol Butyl Ether | 4.02% |
|  | 21.00 oz. | Anti Rust Mixture | .71% |
| E. | 8.00 oz. | Dowicil 75 Bactacide | .27% |
|  | 16.00 oz. | Water | .54% |
| F. | 95.00 oz. | Methyl Alcohol | 3.21% |
|  | 132.80 oz | Water | 4.49% |

Component A is again mixed with high sheer agitation and premixed component B is then added to component A with high sheer agitation. Component C is also added to the latter admixture under high sheer agitation. Thereafter 12 to 50 pounds of dry titanium Dioxide is added with high sheer agitation until a minimum of °7 on the Hageman Gauge is attained. Color pigment is added (10 oz. to 50 oz.), as required to obtain the pigmentation desired. Premixed components D, E and F are then successively added one at a time to the latter admixture in succession, all with high sheer agitation. In this case the characteristics remain the same as the first-described solution B, except, of course, the same is pigmented rather than being clear, but all remaining characteristics are the same.

Although in a preferred embodiment of the invention as has been specifically illustrated and described herein, it is to be understood that minor variations may be made in the apparatus without departing from the spirit and scope of the invention, as defined in the appended claims.

We claim:

1. A method of manufacturing a rust-proof, leak-proof and air-impervious welded tire rim comprising the steps of providing a pair of rim bodies each of which includes a peripheral bead and at least one of which includes a valve seat defined by an opening with the rim bodies being welded to each other along an exterior circumferential weld; liquid-cleaning the welded rim; and applying to the entirety of all exposed surfaces of the rim an air-impervious coating of resilient copolymeric material whereby any porosity of the circumferential weld is sealed against air migration and the rim beads and valve seat are all totally coated with a resilient air-impervious coating for effectively sealing against air migration in association with a tire bead and an air valve body, respectively.

2. The method as defined in claim 1 wherein the liquid cleaning step is performed utilizing a heated water bath including a blend of caustic alkalies, sequestrants and surfactants.

3. The method as defined in claim 2 wherein the liquid cleaning step is performed by dipping the rim in a bath of the cleaning liquid at an elevated temperature causing attendant vaporization of the cleaning liquid; elevating the rim above the cleaning liquid bath, and spraying water upon the rim to rinse the same and simultaneously therewith collecting the sprayed water in the cleaning liquid bath to replace vaporized liquid.

4. The method as defined in claim 1 wherein the coating-applying step is performed utilizing a styrene-acrylate copolymer.

5. The method as defined in claim 4 wherein the liquid cleaning step is performed by dipping the rim in a bath of the cleaning liquid at an elevated temperature causing attendant vaporization of the cleaning liquid; elevating the rim above the cleaning liquid bath, and spraying water upon the rim to rinse the same and simultaneously therewith collecting the sprayed water in the cleaning liquid bath to replace vaporized liquid.

6. The method as defined in claim 1 wherein the coating-applying step is performed utilizing a liquid blend of styrene-acrylate copolymer, methyl alcohol, aqua ammonia and water with the copolymer constituting a major portion of the coating.

7. The method as defined in claim 6 wherein the liquid cleaning step is performed by dipping the rim in a bath of the cleaning liquid at an elevated temperature causing attendant vaporization of the cleaning liquid;

elevating the rim above the cleaning liquid bath, and spraying water upon the rim to rinse the same and simultaneously therewith collecting the sprayed water in the cleaning liquid bath to replace vaporized liquid.

8. The method as defined in claim 1 wherein the coating-applying step is performed utilizing a liquid blend of styrene-acrylate copolymer, methyl alcohol, aqua ammonia and water with the copolymer constituting a major portion of the coating, and the liquid cleaning step is performed utilizing a heated water bath including a blend of caustic alkalies, sequestrants and surfactants.

9. The method as defined in claim 8 wherein the liquid cleaning step is performed by dipping the rim in a bath of the cleaning liquid at an elevated temperature causing attendant vaporization of the cleaning liquid; elevating the rim above the cleaning liquid bath, and spraying water upon the rim to rinse the same and simultaneously therewith collecting the sprayed water in the cleaning liquid bath to replace vaporized liquid.

10. The method as defined in claim 1 wherein the liquid cleaning step is performed at a temperature range of generally between 200°-210° F.

11. The method as defined in claim 1 wherein the liquid cleaning step is performed by dipping the rim in a bath of the cleaning liquid at an elevated temperature causing attendant vaporization of the cleaning liquid; elevating the rim above the cleaning liquid bath, and spraying water upon the rim to rinse the same and simultaneously therewith collecting the sprayed water in the cleaning liquid bath to replace vaporized liquid.

12. The method as defined in claim 1 wherein the liquid cleaning step is performed by dipping the rim in a bath of the cleaning liquid at an elevated temperature causing attendant vaporization of the cleaning liquid; elevating the rim above the cleaning liquid bath, spraying water upon the rim to rinse the same, simultaneously therewith collecting the sprayed water in the cleaning liquid bath to replace vaporized liquid, and the coating-applying step is performed utilizing a styrene-acrylate copolymer.

13. The method as defined in claim 1 wherein the copolymeric components represents approximately 80 percent by weight of the total coating material.

14. The method as defined in claim 1 wherein the copolymeric component represents approximately 70 to 90 percent by weight of the total coating material.

15. The method as defined in claim 1 wherein the copolymeric components represents approximately 80 percent by weight of the total coating material, and the remaining components of the coating material include water, methyl alcohol and ethylene glycol butyl ether.

16. The method as defined in claim 1 wherein the copolymeric components represents approximately 80 percent by weight of the total coating material, and a further component of the coating material is a coloring agent.

17. The method as defined in claim 1 including the steps of moving the rim successively down into and up out of a bath of the cleaning liquid and copolymeric material respectively, and transferring the rim along a generally horizontal path from the cleaning liquid bath to the copolymeric material bath.

18. The method as defined in claim 17 wherein the liquid cleaning step is performed utilizing a heated water bath including a blend of caustic alkalies, sequestrants and surfactants.

19. The method as defined in claim 19 wherein the coating-applying step is performed utilizing a styrene-acrylate copolymer.

20. The method as defined in claim 17 wherein the coating-applying step is performed utilizing a liquid blend of styrene-acrylate copolymer, methyl alcohol, aqua ammonia and water with the copolymer constituting a major portion of the coating.

21. The method as defined in claim 17 wherein the coating-applying step is performed utilizing a liquid blend of styrene-acrylate copolymer, methyl alcohol, aqua ammonia and water with the copolymer constituting a major portion of the coating, and the liquid cleaning step is performed utilizing a heated water bath including a blend of caustic alkalies, sequestrants and surfactants.

22. The method as defined in claim 17 wherein the liquid cleaning step is performed at a temperature range of generally between 200°-210° F.

23. The method as defined in claim 1 including the steps of moving the rim successively down into and up out of a bath of the cleaning liquid and copolymeric material respectively, transferring the rim along a generally horizontal path from the cleaning liquid bath to the copolymeric material bath, and maintaining the rim supported upon its peripheral beads with its axis of rotation generally horizontal during the performance of the latter defined moving and transferring steps.

24. A method of manufacturing a tire rim having rim beads, a valve seat and associated welds coated with a resilient coating of copolymeric material to thereby render the entire rim rust-proof and impervious to air leakage/migration at the welds, the rim beads and associated tire beads, and an associated air valve at the valve seat comprising the steps of providing a shaft and a pair of annular rim bodies each of which includes a peripheral bead and at least one of which includes a valve seat defined by an opening; assembling the shaft within the annular rim bodies; welding each rim body to the shaft by an external peripheral weld and welding the rim bodies to each other by an internal circumferential weld thereby forming a welded rim; supporting the welded rim upon its rim beads; lowering the welded rim into a heated bath of cleaning solution including a blend of caustic alkalies, sequestrants and surfactants; elevating the cleaned welded rim above the cleaning solution bath and thereat spray rinsing the cleaned welded rim with water and simultaneously therewith collecting the sprayed water in the cleaning solution bath to replace vaporized cleaning solution; lowering the cleansed rim into an air-impervious coating bath including a blend of styrene-acrylate copolymer, methyl alcohol, aqua ammonia and water with the copolymer constituting a major portion of the coating, removing the coated rim from the coating bath; and drying the coated rim whereby substantially the entirety of the rim is coated with a relatively thin resilient coating creating a resilient sealing seat at each rim bead and valve seat opening and an air-impervious coating over the welds.

25. The method as defined in claim 24 including the step of placing a tire on the rim and a valve in the rim opening in respective sealing engagement with the rim bead and valve seat coatings, and air-inflating the tire.

26. The method as defined in claim 24 including the step of touching-up any uncoated rim area with the air-impervious coating.

27. A method of reconditioning a rust-proof, leak-proof and air-impervious tire rim comprising the steps of providing a rim body including a pair of peripheral beads and at least one valve seat defined by an opening; cleaning the rim; and applying to the entirety of all exposed surfaces of the rim an air-impervious coating of resilient copolymeric material whereby any porosity of the rim is sealed against air migration and the rim beads and valve seat are all totally coated with a resilient air-impervious coating for effectively sealing against air migration in association with a tire bead and an air valve body, respectively.

28. The method as defined in claim 27 wherein the liquid cleaning step is performed utilizing a heated water bath including a blend of caustic alkalies, sequestrants and surfactants.

29. A method of refinishing a rim/wheel comprising the steps of placing a rim/wheel in a first chamber, maintaining the axis of the rim/wheel in a generally horizontal plane while the rim/wheel is in the first chamber, performing a hot liquid cleaning operation upon the rim/wheel while the rim/wheel is in the first chamber, transferring the rim/wheel after the hot liquid cleaning from the first chamber to a second chamber, maintaining the axis of the rim/wheel in a generally horizontal plane while the rim/wheel is in the second chamber, applying an air-impervious coating of resilient protective synthetic material upon all surfaces of the rim/wheel while the rim/wheel is in the second chamber, and removing the rim/wheel from the second chamber for subsequent processing.

30. The refinishing method as defined in claim 29 wherein the rim/wheel includes a pair of beads completely peripherally coated by the coating applying step; the method being further characterized by placing a tire upon the coated rim/wheel, and pressurizing the tire to bring beads of the tire into intimate peripheral resilient sealing relationship with the resilient coating of the rim/wheel beads.

31. The refinishing method as defined in claim 29 wherein the transferring of the rim/wheel is performed along a predetermined path of travel extending at least between the first and second chambers, and the path of travel and the rim/wheel axis are disposed in generally parallel relationship during the movement of the rim/wheel along the predetermined path of travel.

32. The refinishing method as defined in claim 29 wherein the step of transferring the rim/wheel is performed along a predetermined path of travel which includes a generally linear first path portion between the first and second chambers, and at least a generally linear second path portion transverse to the first path portion along which the rims/wheels are transported into and out of at least one of the first and second chambers.

33. The refinishing method as defined in claim 29 wherein the transferring of the rim/wheel is performed along a predetermined path of travel which includes a generally linear first path portion between the first and second chambers, and at least two generally linear second and third path portions transverse to the first path portion along which the rim/wheels are transported out of at least one of said first and second chambers.

34. The refinishing method as defined in claim 29 wherein the coating-applying step is performed in two separate coating-applying stages.

35. The refinishing method as defined in claim 29 wherein the cleaning step is performed by utilizing a liquid spray.

36. The refinishing method as defined in claim 29 wherein the rim/wheel includes a valve opening completely peripherally coated during the coating-applying step; the method further being characterized by inserting a valve stem into and in sealing relationship with the resilient coating of the valve opening.

37. A method of refinishing a rim/wheel comprising the steps of conveying a rim/wheel along a generally first path of travel in a first direction between a starting position and finishing position, conveying the rim/wheel along a second generally reciprocal path of travel in a second direction generally transverse to the first path to and from a cleaning station, maintaining the axis of the rim/wheel in a generally horizontal plane while the rim/wheel is at the cleaning station, performing a hot liquid cleaning operation upon the rim/wheel while the rim/wheel is at the cleaning station, after performing the hot liquid cleaning operation continuing the conveyance of the rim/wheel generally along the first path of travel to a coating station, applying a coating of protective material upon at least selected surfaces of the rim/wheel while the rim/wheel is at the coating station, and removing the rim/wheel from the second station.

38. The refinishing method as defined in claim 37 including the step of conveying the rim/wheel along a third generally reciprocal path of travel downstream of the second path of travel and generally transverse to the first path of travel.

39. The refinishing method as defined in claim 38 wherein the rim/wheel is conveyed along the third path of travel to a station at which the rim/wheel is maintained with its axis in a generally horizontal plane.

40. The refinishing method as defined in claim 38 including the step of directing a liquid spray against the rim/wheel before the performance of the coating step.

41. The refinishing method as defined in claim 40 wherein the conveyance along the second path of travel is generally vertical.

42. The refinishing method as defined in claim 40 wherein the rim/wheel is conveyed along the third path of travel to a station at which the rim/wheel is maintained with its axis in a generally horizontal plane.

43. The refinishing method as defined in claim 42 wherein the conveyance along the second path of travel is generally vertical.

44. The refinishing method as defined in claim 38 wherein the conveyance along the second path of travel is generally vertical.

45. The refinishing method as defined in claim 37 including the step of directing a liquid spray against the rim/wheel before the performance of the coating step.

46. The refinishing method as defined in claim 37 wherein the conveyance along the second path of travel is generally vertical.

47. A method of refinishing a rim/wheel comprising the steps of conveying a rim/wheel having a valve opening along a generally first path of travel in a first direction between a starting position and a finishing position, conveying the rim/wheel along a second generally reciprocal path of travel in a second direction generally transverse to the first path to and from a cleaning station, maintaining the axis of the rim/wheel in a generally horizontal plane while the rim/wheel is at the cleaning station, performing a hot liquid cleaning operation upon the rim/wheel while the rim/wheel is at the cleaning station, after performing the hot liquid cleaning operation continuing the conveyance of the rim/wheel generally along the first path of travel to a coating station, applying an air impervious coating of resilient protected synthetic polymeric/copolymeric material upon at least selected surfaces of the rim/wheel including completely coating the valve opening periphery, removing the rim/wheel from the second station and inserting a valve stem into and in sealing relationship with the resilient coating of the valve opening.

* * * * *